United States Patent
Mikutsu (10) Patent No.: US 8,491,039 B2
(45) Date of Patent: Jul. 23, 2013

(54) VEHICULAR REAR IMPACT SENSOR MOUNTING STRUCTURE

(75) Inventor: Satoshi Mikutsu, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 12/922,467

(22) PCT Filed: Mar. 20, 2009

(86) PCT No.: PCT/IB2009/000566
§ 371 (c)(1),
(2), (4) Date: Sep. 14, 2010

(87) PCT Pub. No.: WO2009/115911
PCT Pub. Date: Sep. 24, 2009

(65) Prior Publication Data
US 2011/0018309 A1    Jan. 27, 2011

(30) Foreign Application Priority Data

Mar. 21, 2008 (JP) .................... 2008-074091

(51) Int. Cl.
*B60R 21/0136* (2006.01)
*B60R 19/34* (2006.01)

(52) U.S. Cl.
USPC ..................... 296/187.11; 180/274

(58) Field of Classification Search
USPC ........... 296/187.11, 193.09, 203.04; 293/102, 293/132, 133, 155; 180/274
See application file for complete search history.

(56) References Cited

U.S. PATENT DOCUMENTS

| 2,207,666 | A | 7/1940 | Hirabayashi |
| 5,119,901 | A | 6/1992 | Buie |
| 6,459,366 | B1 | 10/2002 | Foo et al. |
| 6,607,212 | B1 * | 8/2003 | Reimer et al. ............... 280/735 |
| 7,137,472 | B2 * | 11/2006 | Aoki ............................ 180/274 |
| 7,258,191 | B1 * | 8/2007 | Rammer ...................... 180/274 |
| 7,364,222 | B2 * | 4/2008 | Tanabe ..................... 296/187.03 |
| 7,509,191 | B2 * | 3/2009 | Mae .................................. 701/1 |

(Continued)

FOREIGN PATENT DOCUMENTS

| JP | U-50-77936 | 7/1975 |
| JP | U-61-57064 | 4/1986 |

(Continued)

OTHER PUBLICATIONS

Japanese Office Action dated Dec. 7, 2009 in Japanese Patent Application No. 2008-074091 (with translation).

(Continued)

*Primary Examiner* — Glenn Dayoan
*Assistant Examiner* — Gregory Blankenship
(74) *Attorney, Agent, or Firm* — Oliff & Berridge, PLC (57) ABSTRACT

A vehicular rear impact sensor mounting structure includes a pair of rear side members which are parallel to one another in a vehicle width direction; a rear bumper reinforcement that is connected to rear end portions of the rear side members; a lower back panel that is fitted to the rear side members at a predetermined distance from the rear bumper reinforcement, and that is forward of the rear bumper reinforcement in a vehicle longitudinal direction. A rear impact sensor for detecting a rear, impact to a vehicle is provided on the inside surface of the lower back panel.

11 Claims, 11 Drawing Sheets

U.S. PATENT DOCUMENTS

| | | | |
|---|---|---|---|
| 7,556,118 B2 * | 7/2009 | Huh et al. | 180/274 |
| 7,635,042 B2 * | 12/2009 | Mader | 180/274 |
| 7,733,219 B2 * | 6/2010 | Kamei et al. | 340/436 |
| 2005/0285430 A1 | 12/2005 | Gerlach et al. | |
| 2006/0208510 A1 * | 9/2006 | Takahashi et al. | 293/102 |
| 2007/0114803 A1 * | 5/2007 | Takahashi et al. | 293/102 |
| 2007/0164574 A1 * | 7/2007 | Tanabe | 293/102 |
| 2007/0200692 A1 * | 8/2007 | Kamel et al. | 340/436 |
| 2007/0222236 A1 * | 9/2007 | Takahashi et al. | 293/102 |
| 2008/0011536 A1 * | 1/2008 | Pipkorn et al. | 180/274 |
| 2009/0021359 A1 * | 1/2009 | Tanabe | 340/436 |
| 2011/0018309 A1 * | 1/2011 | Mikutsu | 296/187.11 |

FOREIGN PATENT DOCUMENTS

| | | |
|---|---|---|
| JP | U-62-58266 | 4/1987 |
| JP | U-64-7053 | 1/1989 |
| JP | U-6-65117 | 9/1994 |
| JP | A-11-342822 | 12/1999 |
| JP | A-2001-247008 | 9/2001 |
| JP | A-2005-153592 | 6/2005 |
| JP | A-2005-254921 | 9/2005 |
| JP | A-2006-82731 | 3/2006 |
| JP | A-2006-103659 | 4/2006 |
| WO | WO 2007/028666 A1 | 3/2007 |

OTHER PUBLICATIONS

Japanese Office Action dated Jun. 29, 2010 in Japanese Patent Application No. 2008-074091 (with translation).

International Search Report dated Sep. 28, 2009 in International Patent Application No. PCT/IB2009/000566.

Written Opinion of the International Searching Authority dated Sep. 28, 2009 in International Patent Application No. PCT/IB2009/000566.

Response to the Written Opinion of the International Searching Authority dated Jan. 19, 2010 in International Patent Application No. PCT/IB2009/000566.

* cited by examiner

VEHICULAR REAR IMPACT SENSOR MOUNTING STRUCTURE

BACKGROUND OF THE INVENTION

1. Field of the Invention

The invention relates to a vehicular rear impact sensor mounting structure for detecting a rear impact to a vehicle to which it is applied.

2. Description of the Related Art

Japanese Patent Application Publication No. 11-342822 (JP-A-11-342822), for example, describes technology in which a rear sensor for detecting when external force equal to or greater than a predetermined value is applied a rear portion of a vehicle body is provided in a rear bumper. In a vehicle to which this technology has been applied, a head airbag inflates and deploys from a seatback when a rear impact is detected by the rear sensor.

However, this related art only states that the rear sensor is provided in the rear bumper and does not describe the specific structure for adequately and quickly detecting a rear impact.

SUMMARY OF THE INVENTION

This invention provides a vehicular rear impact sensor mounting structure that detects a rear impact to a vehicle quickly.

A first aspect of the invention relates to a vehicular rear impact sensor mounting structure that includes a pair of rear side members which are parallel to one another in a vehicle width direction, a rear bumper reinforcement that is connected to rear end portions of the rear side members, a lower back panel that is fitted to the rear side members at a predetermined distance from the rear bumper reinforcement, and that is forward of the rear bumper reinforcement in a vehicle longitudinal direction, and a rear impact sensor that is provided to detect a rear impact to a vehicle, on the lower back panel.

In this first aspect, when a colliding body impacts the rear bumper reinforcement from the rear, the rear bumper reinforcement deforms and contacts the lower back panel. The rear impact sensor outputs a signal (such as an analog signal or an ON-OFF signal) in response to movement from impact that is transmitted from the rear bumper reinforcement to the lower back panel via a support structure, or movement from impact that is transmitted by the rear bumper reinforcement directly contacting the lower back panel.

Here, with this vehicular rear impact sensor mounting structure, the rear impact sensor is provided (i.e., either directly or indirectly mounted) on the lower back panel with which the rear bumper reinforcement comes into contact when it deforms, so a large movement following the rear impact is input to the rear impact sensor from the initial stage of the rear impact. Therefore, with this vehicular rear impact sensor mounting structure, the rear impact is detected (i.e., whether or not a rear impact has occurred, and if so, the extent of that rear impact, is determined) based on the large movement input to the rear impact sensor. As a result, a rear impact is detected quickly.

In this way, the first aspect detects a rear impact to a vehicle quickly. Also, with a light impact to the rear bumper reinforcement, for example, the rear bumper reinforcement will not deform to the extent that it contacts the lower back panel so the movement input to the rear impact sensor is significantly smaller than it is when the rear bumper reinforcement contacts the lower back panel. Therefore, with this vehicular rear impact sensor mounting structure, it is possible to determine the extent of a rear impact according to the output of the rear impact sensor.

In the vehicular rear impact sensor mounting structure of the first aspect, at least two of the rear impact sensors may be provided apart from one another in the vehicle width direction in an area on the lower back panel which overlaps with the rear bumper reinforcement when viewed from the rear, and between the pair of rear side members.

With this structure, at least two rear impact sensors are arranged on the lower back panel between the pair of rear side members and in an area that overlaps with the rear bumper reinforcement with viewed from the rear. Therefore, when the rear bumper reinforcement deforms from a rear impact, the rear bumper reinforcement directly contacts the portion of the lower back panel where one of the rear impacts sensors is arranged or therearound. Accordingly, a large movement from the rear impact can be input to the rear impact sensor from an early stage of the rear impact, such that the movement from the rear impact can be detected by the rear impact sensor more quickly.

Moreover, one of the rear impact sensors may be provided on each side portion, in the vehicle width direction, of the lower back panel.

With this structure, the left and right rear impact sensors are arranged generally symmetrical with respect to the center portion of the lower back panel in the vehicle width direction. Therefore, movement resulting from various types of rear impacts is able to be detected quickly by providing two rear impact sensors.

Also, in the vehicular rear impact sensor mounting structure of the first aspect, a reinforcing member that reinforces a region that includes a portion where the pair of rear side members are connected to the lower back panel may be provided on the lower back panel, and the rear impact sensor may be arranged on the reinforcing member or on the lower back panel in an area opposite the area where the reinforcing member is arranged on the lower back panel.

With this structure, the rear impact sensor is provided on a portion of the lower back panel that is reinforced by the reinforcing member or on the reinforcing member itself. Also, movement from a rear impact is transmitted to the lower back panel via at least the rear bumper reinforcement and the rear side member. Here, a region that includes the portion corresponding to the portion where the rear impact sensor is arranged and the portion of the lower back panel where the rear side member is connected, is reinforced by the reinforcing member. As a result, a large movement from the rear impact can be input to the rear impact sensor from the initial stage of the rear impact by the movement transmission path through the rear bumper reinforcement and the rear side member as well, which helps a rear impact to the vehicle to be detected earlier.

Moreover, the reinforcing member may include a pair of extended portions each of which extends in the vertical direction from the portion where a corresponding one of the pair of rear side members is connected to the lower back panel, and one rear impact sensor may be provided on each of the extended portions.

With this structure, the rear impact sensor is arranged above or below the area of the lower back panel that overlaps with the rear bumper reinforcement when viewed from the rear. As described above, a large movement from the rear impact can be input to the rear impact sensor from the early stage of the rear impact through the movement transmission path via the rear bumper reinforcement and the rear side members. Accordingly, a rear impact to the vehicle can still be detected quickly even if the rear impact sensor is unable to be arranged in the area of the lower back panel that overlaps with the rear bumper reinforcement when viewed from the rear.

Furthermore, the rear impact sensor may be arranged below a lower edge of a back door for opening and closing a back door opening.

With this structure, the rear impact sensor is arranged below the back door so erroneous detection of movement caused by opening and closing the back door opening using the back door can be minimized, thereby enabling movement from a rear impact to be detected more quickly (and more accurately).

Also, with the vehicular rear impact sensor mounting structure of the first aspect, the rear impact sensor may be provided in a center portion of the lower back panel between the pair of rear side members, in an area that overlaps with the rear bumper reinforcement when viewed from the rear.

With this structure, the rear impact sensor is arranged on the center portion in the vehicle width direction of the lower back panel and in an area that overlaps with the rear bumper reinforcement when viewed from the rear. Therefore, when the rear bumper reinforcement deforms during a rear impact, it directly contacts the portion of the lower back panel where the rear impact sensor is arranged or therearound. Accordingly, a large movement from the rear impact can be input to the rear impact sensor from the initial stage of the rear impact, such that movement from a rear impact can be detected relatively quickly using only a single rear impact sensor.

In the structure described above, at least one rear impact sensor may be provided between the pair of rear side members in an area on the lower back panel that overlaps with the rear bumper reinforcement when viewed from the rear. Also, the vehicular rear impact sensor mounting structure may also include an impact transmitting portion that shortens the distance in the vehicle longitudinal direction between the rear bumper reinforcement and the rear impact sensor to less than the predetermined distance.

With this structure, the distance between the rear bumper reinforcement and the lower back panel is shorter in the area where the impact transmitting portion is located. Therefore, the running distance until movement is input from the rear bumper reinforcement to the rear import sensor is short so movement from a rear impact can be detected more quickly.

Alternatively, the impact transmitting portion may be a protruding portion which is provided on the rear bumper reinforcement in the area that overlaps with the rear impact sensor when viewed from the rear, and which protrudes toward the lower back panel.

With this structure, the distance between the rear bumper reinforcement and the lower back panel, i.e., the rear impact sensor, is shorter in the area where the protruding portion is located. Therefore, movement from a rear impact can be detected more quickly by the protruding portion contacting the lower back panel (i.e., the rear impact sensor) before other portions of the rear bumper reinforcement.

In the structure described above, the impact transmitting portion may be a protruding portion to which the rear impact sensor is mounted, which is provided on a portion of the lower back panel that overlaps with the rear bumper reinforcement when viewed from the rear and which protrudes toward the rear bumper reinforcement.

With this structure, the distance in the longitudinal direction of the vehicle between the rear impact sensor and the rear bumper reinforcement is shorter at the protruding portion of the lower back panel, i.e., at the area where the rear impact sensor is arranged. Therefore, movement from a rear impact can be detected more quickly by the protruding portion (i.e., the rear impact sensor) contacting the rear bumper reinforcement before it contacts other portions of the lower back panel.

The vehicular rear impact sensor mounting structure as described above offers the advantage of being able to quickly detect a rear impact to a vehicle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements and wherein.

DETAILED DESCRIPTION OF EMBODIMENTS

A vehicular rear satellite sensor mounting structure 10 that functions as the vehicular rear impact sensor mounting structure according to a first example embodiment of the invention will be described with reference to FIGS. 1 to 4. First, the general structure of a rear impact occupant protection device 12 of a vehicle 11 as the vehicle to which the vehicular rear satellite sensor mounting structure 10 is applied will be described. Then, the vehicular rear satellite sensor mounting structure 10 will be described. Incidentally, the arrow FR in the drawings indicates the forward direction in the longitudinal direction of the vehicle body (hereinafter simply referred to as "forward" or "front"). The arrow UP in the drawings indicates the upward direction in the vertical direction of the vehicle body (hereinafter simply referred to as "up"). The arrow IN in the drawings indicates the inside direction in the vehicle width direction (hereinafter simply referred to as the "inside"), and the arrow W in the drawings indicates the vehicle width direction (hereinafter referred to as the "width direction").

Figure 4:
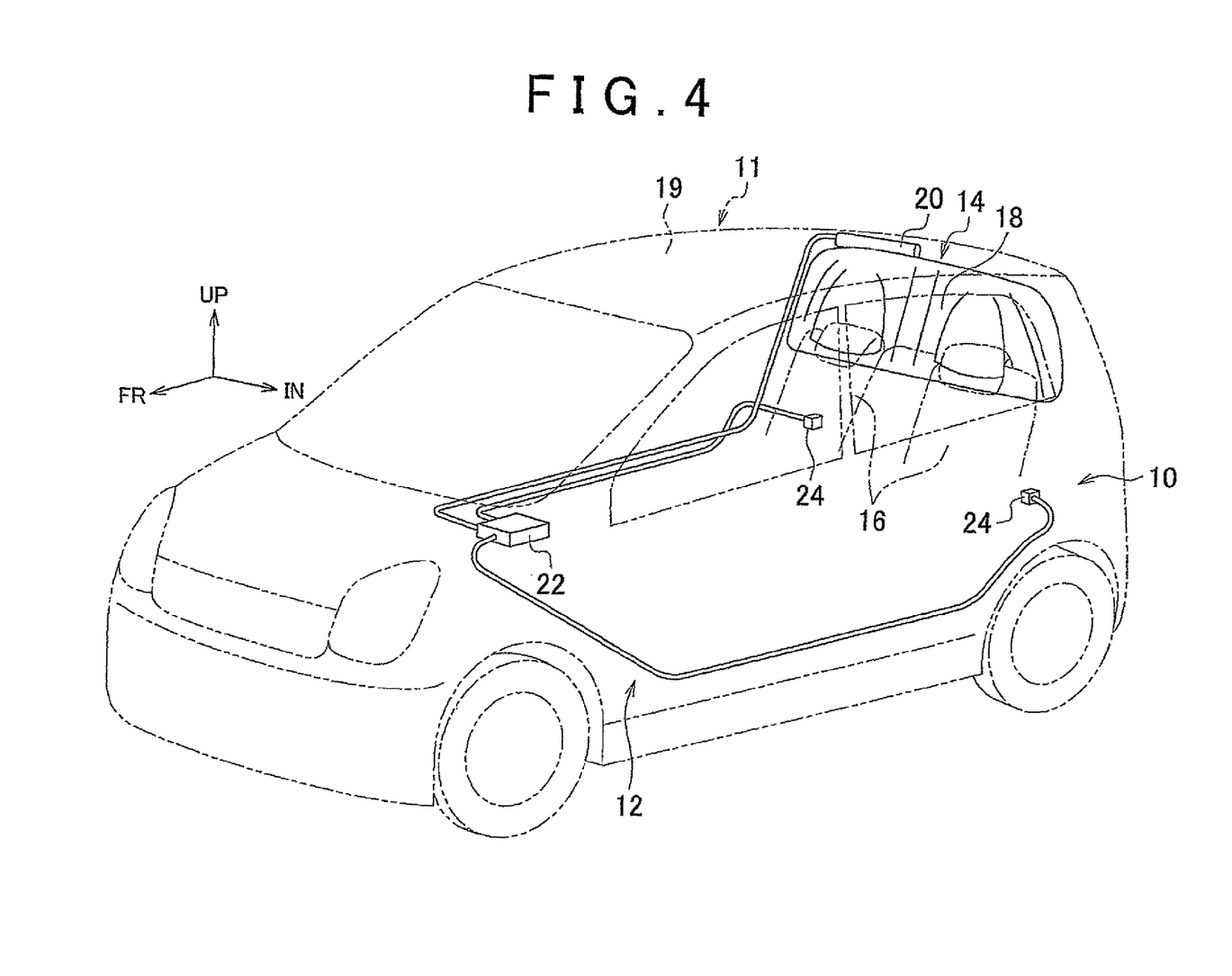
FIG. 4 is a perspective view showing a frame format, as viewed from the side, of the vehicle to which the vehicular rear satellite sensor mounting structure according to the first example embodiment of the invention has been applied.

FIG. 4 is a perspective view showing a frame format of the rear impact occupant protection system 12 of the vehicle 11. As shown in the drawing, the rear impact occupant protection system 12 includes a rear airbag apparatus 14. The rear airbag apparatus 14 includes a rear airbag 18 which inflates and deploys behind the head of an occupant seated in a rear seat 16, and an inflator 20 for supplying a gas to the rear airbag 18. FIG. 4 shows the rear airbag 18 in a deployed state.

Although not shown, the rear airbag 18 is housed, together with the inflator 20, folded up in a rear end portion of a roof 19, i.e., in a portion above the rear seat 16 when the rear airbag apparatus 14 is inactive (i.e., until the rear airbag apparatus 14 is activated).

The inflator 20 is electrically connected to an airbag ECU 22 that serves as a control apparatus and controls the operation of the inflator 20. In this example embodiment, the airbag ECU 22 is arranged in a central portion of the vehicle body (such as in a floor tunnel) of the vehicle 11, and houses an acceleration sensor that serves as an impact sensor. The airbag ECU 22 activates the inflator 20 when a signal from the acceleration sensor exceeds a threshold value set for a rear impact, i.e., when the acceleration sensor detects a rear impact to the vehicle 11.

The rear impact occupant protection system 12 has rear satellite sensors 24 that function as rear impact sensors which are mounted near the rear end of the vehicle 11. These rear satellite sensors 24 are acceleration sensors that are electrically connected to the airbag ECU 22 and output a signal in response to a rear impact. Upon receiving a detection signal S indicating that acceleration equal to or greater than a predetermined value has been detected by one or both of the rear satellite sensors 24, the airbag ECU 22 lowers the threshold value (i.e., increases the sensitivity) for detecting a rear impact based on the output of the internal acceleration sensor. In other words, the rear satellite sensors 24 are trigger signal generating devices for increasing the rear impact detection sensitivity of the airbag ECU 22.

Incidentally, the rear satellite sensors 24 may also be sensors that output a signal (such as an analog signal) corresponding to the applied acceleration, or they may be acceleration switches that output a signal (such as an ON-OFF signal) based on whether acceleration equal to or greater than a predetermined value has been applied. Also, although not described here, the airbag ECU 22 also detects front and side impacts to the vehicle 11 and controls the activation of front and side airbags, not shown.

The vehicular rear satellite sensor mounting structure 10 is a structure in which the rear satellite sensors 24 are mounted in an area near the rear end of the vehicle 11. As shown in FIG. 4, the vehicle 11 includes a pair of left and right rear satellite sensors 24 that are spaced apart from one another in the vehicle width direction. With the vehicular rear satellite sensor mounting structure 10, the rear satellite sensors 24 are mounted to the vehicle body, as will now be described in detail.

The rear satellite sensors 24 are arranged in regions A (see FIG. 3) located below a back door opening 26 that is opened and closed by a back door 25 of the vehicle 11, and forward, in the longitudinal direction of the vehicle, of a rear bumper reinforcement 30 that forms a rear bumper 28. The regions A are regions that overlap with the rear bumper reinforcement 30 both in the vertical direction and the vehicle width direction, when viewed from the rear.

Figure 1:
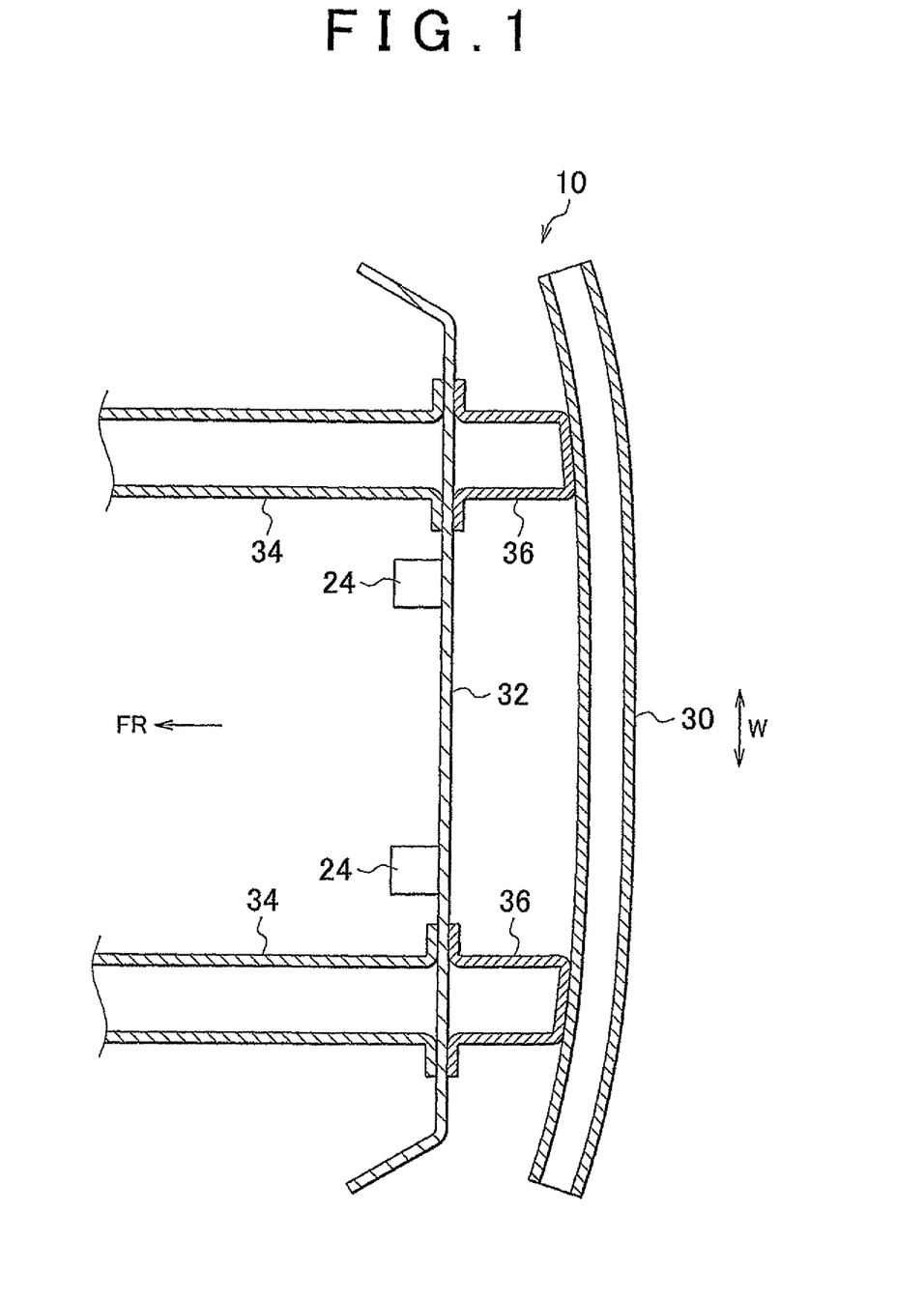
FIG. 1 is an enlarged plan sectional view taken along line I-I in FIG. 3, of a vehicular rear satellite sensor mounting structure according to a first example embodiment of the invention.
Figure 3:
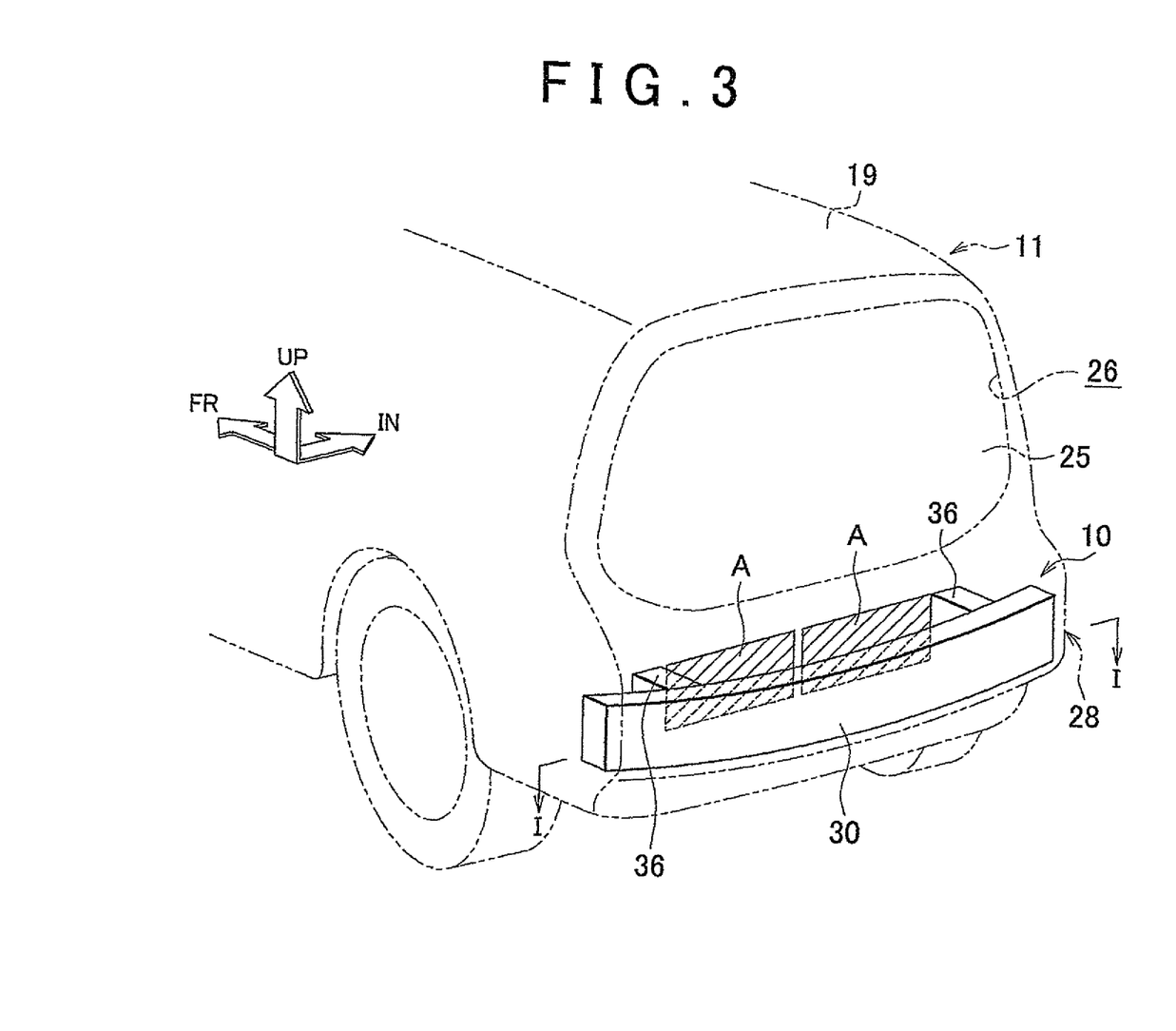
FIG. 3 is a perspective view showing a frame format, as viewed from the rear, of a vehicle to which the vehicular rear satellite sensor mounting structure according to the first example embodiment of the invention has been applied.

More specifically, as shown in FIG. 1 which is an enlarged plan sectional view taken along line I-I in FIG. 3, the rear satellite sensors 24 are fixed to the front surface (i.e., the inside surface) of a lower back panel 32 which is positioned apart from and forward of the rear bumper reinforcement 30. Incidentally, the lower back panel 32 forms a portion that includes a portion below the back door opening 26 of the vehicle 11 (i.e., defines the lower edge of the back door opening 26). Rear end portions of a pair of left and right rear side members (also referred to as rear floor side members) 34 that are arranged apart from one another in the vehicle width direction and parallel to one another with their lengths running in the longitudinal direction of the vehicle, are connected to the lower back panel 32.

The rear bumper reinforcement 30 is connected to the outer surface of the lower back panel 32 via a pair of left and right bumper arms (i.e., a crash box) 36 that are arranged apart from one another in the vehicle width direction. The bumper arms 36 are connected to the back surface of the lower back panel 32 at positions that correspond to the positions where the rear side members 34 are connected to the front surface of the lower back panel 32. By providing these bumper arms 36, a predetermined space (area) is created in the longitudinal direction of the vehicle between the rear bumper reinforcement 30 and the lower back panel 32. These bumper arms 36, together with the rear side members 34, function as a rear side member of the invention.

With the vehicular rear satellite sensor mounting structure 10 according to the first example embodiment, the rear satellite sensors 24 are arranged within the regions A described above, between the left and right rear side members 34 on the inside surface of the lower back panel 32. The two rear satellite sensors 24 are arranged generally symmetrical with respect to the center portion of the lower back panel 32 in the vehicle width direction.

Figure 2:
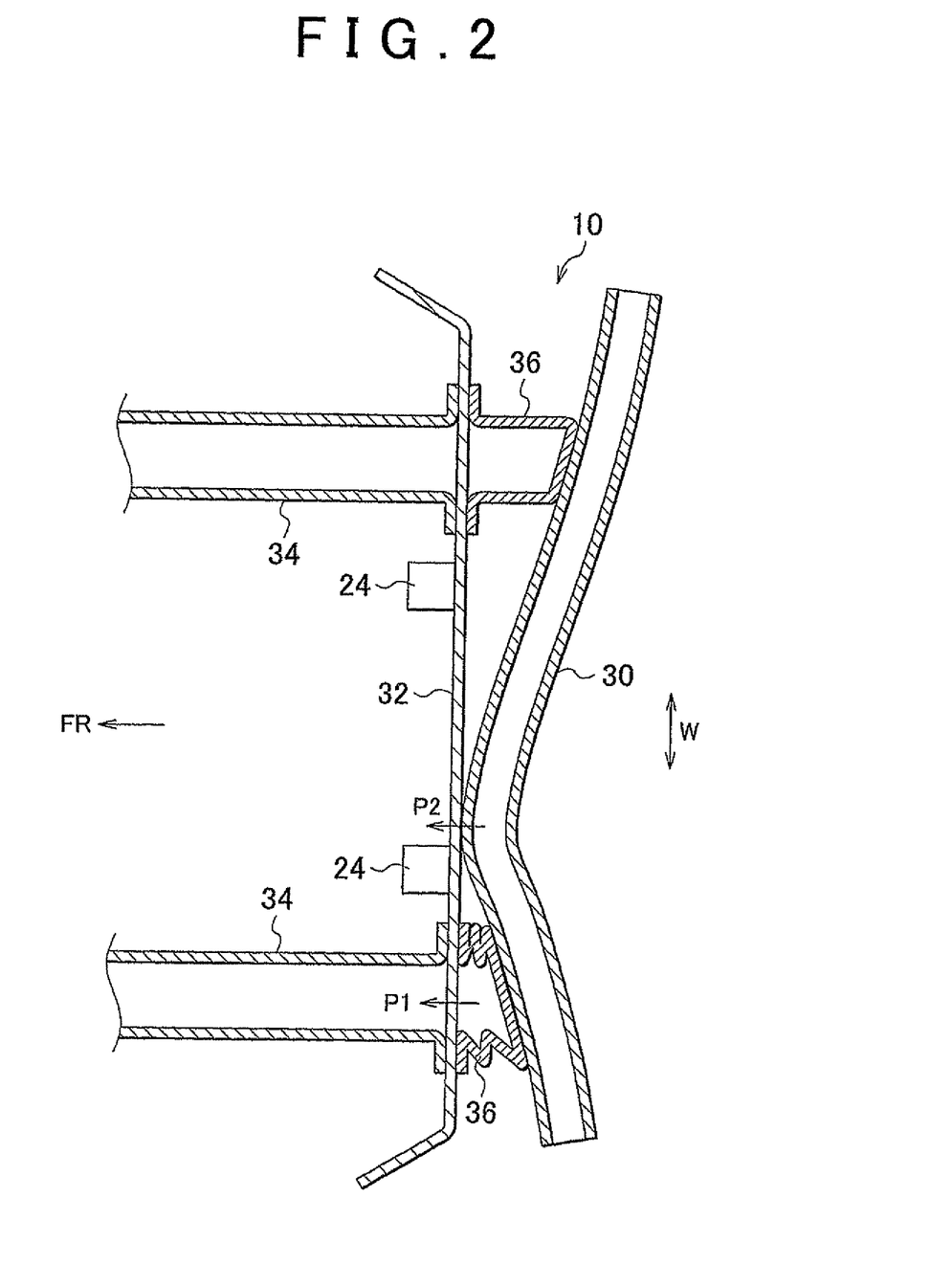
FIG. 2 is a plan sectional view showing the transmission of acceleration to rear satellite sensors by the vehicular rear satellite sensor mounting structure according to the first example embodiment of the invention.

With the vehicle 11 to which the vehicular rear satellite sensor mounting structure 10 having the structure described above has been applied, acceleration (i.e., impact) is transmitted from the rear bumper reinforcement 30 to the lower back panel 32. This acceleration travels along one or both of two transmission paths, i.e., a first path P1 and a second path P2, as shown in FIG. 2. The first path P1 is a path in which acceleration is transmitted from the rear bumper reinforcement 30 to the lower back panel 32 through the bumper arms 36. The second path P2 is a path in which the rear bumper reinforcement 30 which has deformed from a rear impact directly contacts the lower back panel 32.

During a rear impact in which the force of impact is relatively large, acceleration that is transmitted to the lower back panel 32 along the second path P2 is significantly greater than acceleration that is transmitted to the lower back panel 32 along the first path P1. Therefore, the acceleration that is transmitted to the lower back panel 32 along the second path P2 is large. When the rear satellite sensors 24 output a detection signal S (more specifically, when the rear satellite sensor 24 near the position of impact outputs a detection signal S), the airbag ECU 22 lowers the threshold level for detecting a rear impact based on the output of the internal acceleration sensor, and determines whether to activate the rear airbag apparatus 14 based on the output from that acceleration sensor.

If the output from the internal acceleration sensor exceeds the threshold value that has been lowered as described above, the airbag ECU 22 activates the inflator 20. In response, the inflator 20 generates the gas such that the rear airbag 18 is inflates and deploys behind the head of an occupant seated in the back seat (i.e., between the head of the occupant and the back door 25), thus preventing the head of the occupant from striking the back door 25 and the like during a rear impact. That is, the occupant is protected from a rear impact.

Meanwhile, if the impact to the rear of the vehicle 11 during a rear impact is light, the rear bumper reinforcement 30 will not deform at all or will deform only slightly, and acceleration will be transmitted to the lower back panel 32 only through the first path P1. Therefore, the rear satellite sensor 24 will not output a detection signal S so the sensitivity of the acceleration sensor housed in the airbag ECU 22 will remain low. Accordingly, activation of the rear airbag apparatus 14 will be inhibited when impact is light.

Here, in the first example embodiment, the rear satellite sensors 24 are arranged in the regions A which are between the left and right rear side members 34 on the lower back panel 32 and overlap with the rear bumper reinforcement 30 when viewed from the rear. In other words, the rear satellite sensors 24 are arranged in an area of the lower back panel 32 with which the rear bumper reinforcement 30 will come into direct contact if the rear bumper reinforcement 30 deforms during a rear impact. Therefore, a large acceleration that is transmitted through the second path P2 during the initial stage of a rear impact is able to be applied to the rear satellite sensors 24.

Therefore, with the vehicular rear satellite sensor mounting structure 10, a detection signal S indicating that a rear impact has occurred can be output from the rear satellite sensors 24 quicker than it can with a structure in which the rear satellite sensors 24 are arranged in an area where the acceleration (i.e., impact) level following a rear impact is low (i.e., in an area where an increase in acceleration is slow). That is, the time that it takes the rear satellite sensors 24 to sense a rear impact (i.e., the rear impact sensing time) can be shortened so that the rear impact can be sensed earlier. Therefore, even in a vehicle 11 in which there is not much space between the head of an occupant seated in the rear seat 16 and the back door 25 or the interior of the vehicle 11 behind the head of that occupant, the rear airbag 18 can be deployed quickly after a rear impact, thereby protecting the head of the occupant.

In particular, with the vehicular rear satellite sensor mounting structure 10, the pair of left and right rear satellite sensors 24 are provided which enables the rear impact sensing time to be even shorter so that a rear impact can be sensed even earlier. That is, rear impacts often tend to be offset impacts in which the impact occurs offset to one side in the width direction of the rear bumper reinforcement 30. In this case, the rear bumper reinforcement 30 directly contacts the lower back panel 32 at a portion offset from the center in the width direction, as shown in FIG. 2. Therefore, providing one rear satellite sensor 24 on the left and one rear satellite sensor 24 on the right enables the rear impact sensing timing to be shorter, such that a rear impact can be sensed earlier, even when the rear impact is offset to one side in the width direction, because that impact can be sensed by a rear satellite sensor 24 that is close to the position of impact.

Also, with the vehicular rear satellite sensor mounting structure 10, the rear satellite sensors 24 are mounted to the lower back panel 32 that is positioned apart from and forward of the rear bumper reinforcement 30. Therefore, if the impact is light such that the rear bumper reinforcement 30 does not deform at all or deforms only slightly, a large acceleration will not be transmitted through the second path P2 and be applied to the rear satellite sensors 24. The difference in the level of acceleration that is transmitted through the second path P2 as opposed to the first path P1 is large so with this vehicular rear satellite sensor mounting structure 10 it is easy to distinguish between a rear impact that should cause the rear airbag apparatus 14 to activate and a rear impact that does not require the rear airbag apparatus 14 to activate (i.e., a light impact).

As a result, with the vehicular rear satellite sensor mounting structure 10, in a light impact, the rear impact detection sensitivity of the airbag ECU 22 will not increase from a signal from the rear satellite sensors 24 so the rear airbag apparatus 14 will not be activated.

Next, another example embodiment of the invention will be described. Incidentally, parts or portions that are basically the same as those in the first example embodiment or structure described above will be denoted by the same reference characters used in the first example embodiment or structure described above, and descriptions of those parts or portions will be omitted.

Figure 6:
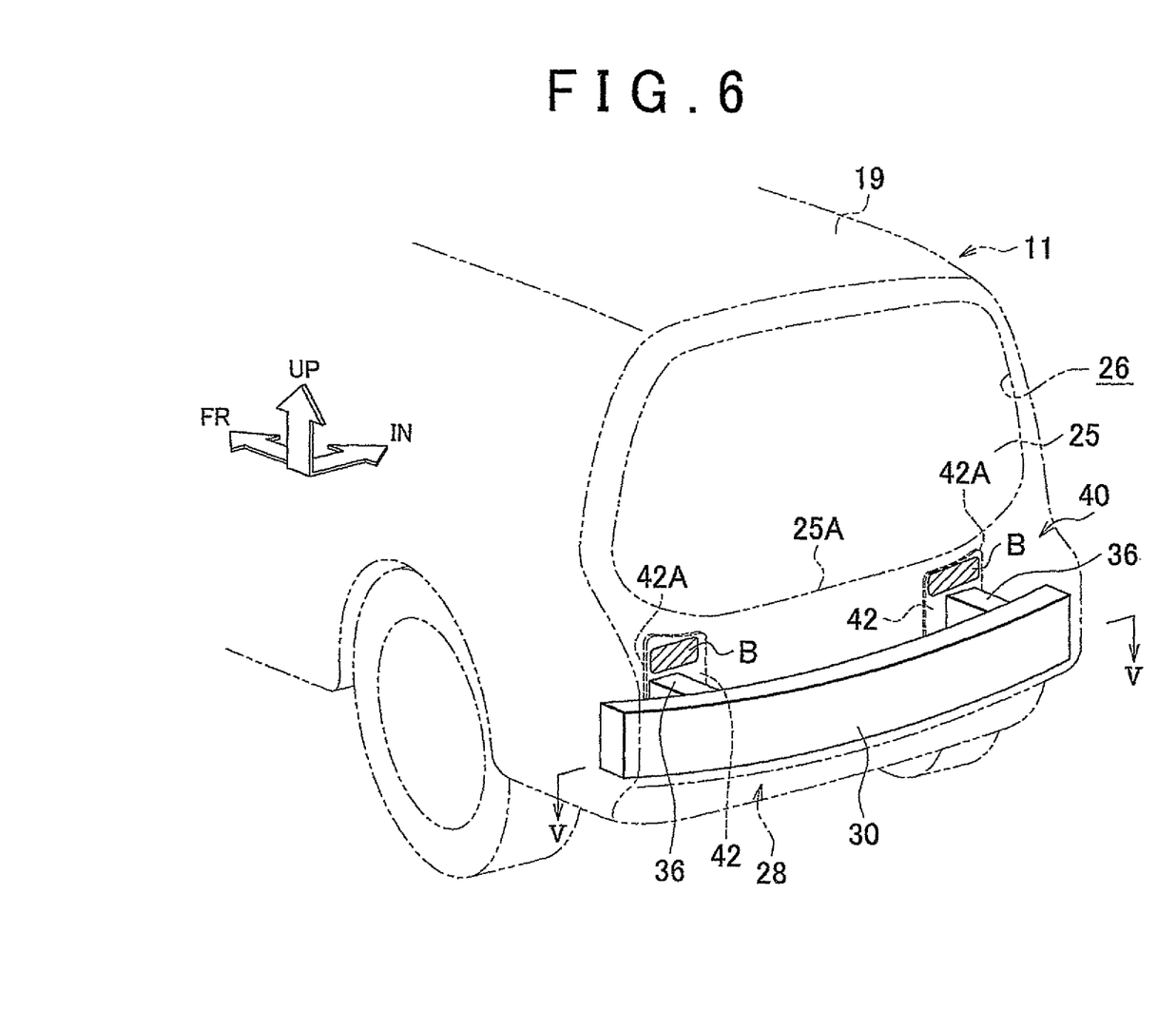
FIG. 6 is a perspective view showing a frame format, as viewed from the rear, of a vehicle to which the vehicular rear satellite sensor mounting structure according to the second example embodiment of the invention has been applied.

FIG. 6 is a perspective view showing a frame format of a rear portion of the vehicle 11 to which a vehicular rear satellite sensor mounting structure 40 according to a second example embodiment of the invention has been applied. As shown in the drawing, the vehicle 11 has lower back panel reinforcements 42 that function as reinforcing members for reinforcing portions that include portions of the lower back panel 32 to which the rear side members 34 are connected. In this second example embodiment, the lower back panel reinforcements 42 are provided in positions on the left and right that correspond to the positions of the rear side members 34 which are also provided on the left and right. Although not shown, the lower back panel reinforcements 42 each have a portion with a bead reinforcing structure or the like formed by press-forming plate material and are joined to the inside surface of the lower back panel 32, thereby reinforcing (i.e., stiffening) the lower back panel 32. Also, material that forms a closed section with the lower back panel 32 may also be used as the lower back panel reinforcements 42.

Figure 5:
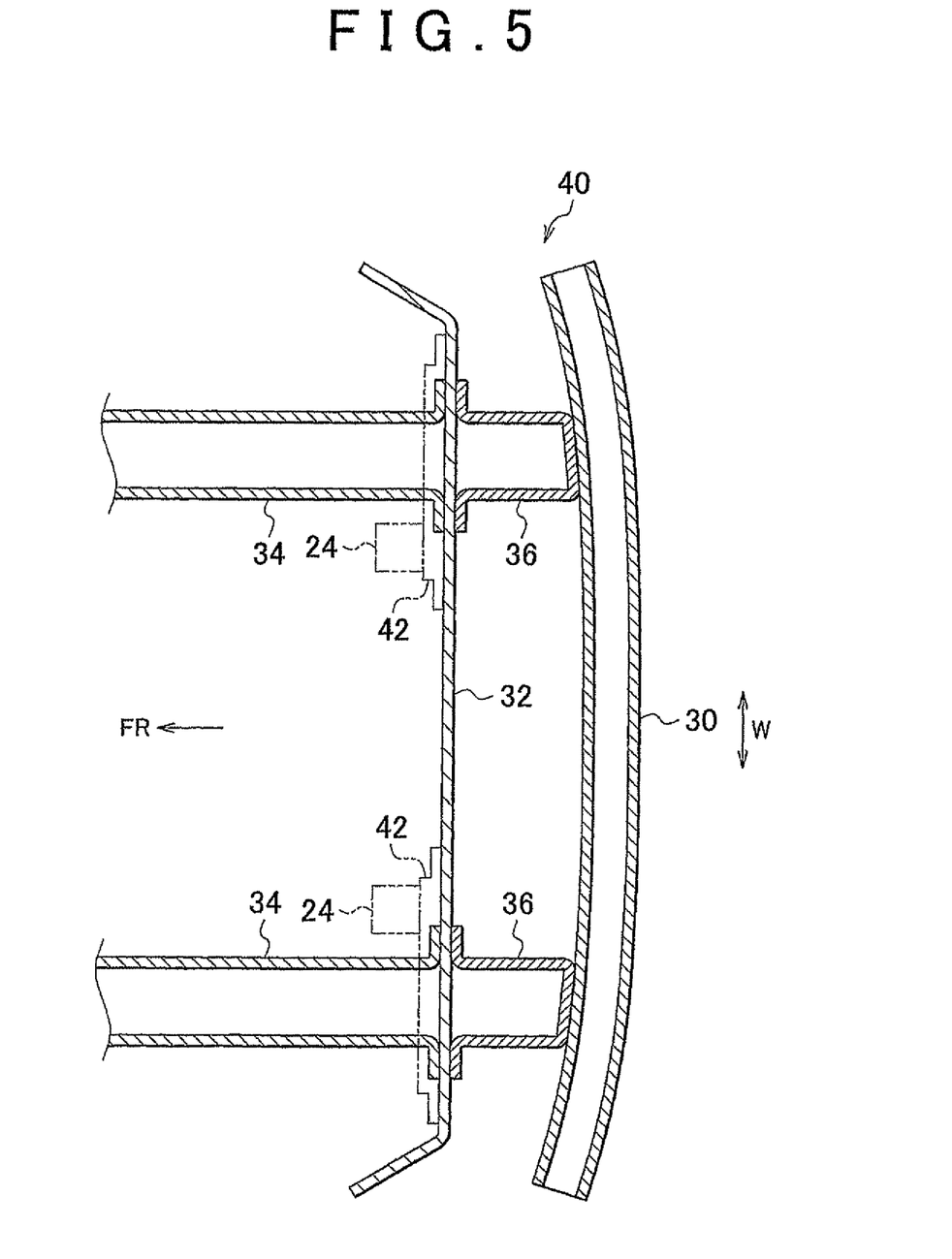
FIG. 5 is an enlarged plan sectional view taken along line V-V in FIG. 6, of a vehicular rear satellite sensor mounting structure according to a second example embodiment of the invention.

FIG. 5 is an enlarged plan sectional view taken along line V-V in FIG. 6. As shown in FIG. 5, with the vehicular rear satellite sensor mounting structure 40, each rear satellite sensor 24 is fixed to the front surface (i.e., the vehicle inside surface) of the corresponding lower back panel reinforcement 42. In other words, with the vehicular rear satellite sensor mounting structure 40, each of the lower back panel reinforcements 42 spans an area that extends from the portion of the lower back panel 32 where the rear side member 34 (bumper arm 36) is connected to the portion of the lower back panel 32 where the rear satellite sensor 24 is mounted.

In this second example embodiment, each of the lower back panel reinforcements 42 extends vertically and has an extended portion 42A that extends upward, as shown in FIG. 6. The rear satellite sensors 24 are arranged in regions B which are areas where the extended portions 42A are located on the lower back panel 32. Also, the regions B are below the back door opening 26. That is, the rear satellite sensors 24 of the vehicular rear satellite sensor mounting structure 40 are arranged below a lower edge 25A of the back door 25 used to open and close the back door opening 26.

The other structure of the vehicular rear satellite sensor mounting structure 40 is the same as the structure corresponding to the vehicular rear satellite sensor mounting structure 10.

Therefore, the second example embodiment is able to obtain basically the same effects as the first example embodiment except for the operational effect that results from the rear satellite sensors 24 being arranged on portions of the lower back panel 32 which overlap with the rear bumper reinforcement 30 when viewed from the rear.

Here, with regard to the transmission of acceleration from the rear bumper reinforcement 30 to the rear satellite sensors 24 during a rear impact, with the vehicular rear satellite sensor mounting structure 40, acceleration is transmitted from the rear bumper reinforcement 30 to the rear satellite sensors 24 by the first path P1 through the bumper arms 36 and the lower back panel reinforcements 42. The ability of acceleration to be transmitted along the first path P1 is improved because the area between the portion where the rear satellite sensors 24 are arranged and the portion of the lower back panel 32 to which the rear side members 34 is connected, i.e., the portion where the bumper arms 36 are connected to the lower back panel 32, is reinforced. As a result, with the vehicular rear satellite sensor mounting structure 40 as well, a large acceleration is transmitted to the rear satellite sensors 24 in the initial stage of a rear impact, thus enabling a signal to be output from the rear satellite sensors 24 quickly. As a result, the rear impact sensing time can be shorter so that a rear impact can be sensed earlier.

Accordingly, with the vehicular rear satellite sensor mounting structure 40, even if the rear satellite sensors 24 are unable to be arranged in regions A, for example, arranging the rear satellite sensors 24 on the lower back panel reinforcements 42 still enables the rear airbag apparatus 14 to be activated quickly after a rear impact.

Also, with the vehicular rear satellite sensor mounting structure 40 in which the rear satellite sensors 24 are arranged below the back door opening 26, the extent of a rear impact is able to be determined better (i.e., it is easier to determine whether to change the sensitivity of the airbag ECU 22) than it is with a structure in which the rear satellite sensors 24 are provided on the back door 25, for example. With a structure in which the rear satellite sensors 24 are provided on the back door 25, for example, the acceleration detection signal S must to be set on the high side to avoid a signal from being output that triggers a switch in the sensitivity of the airbag ECU 22 from the impact produced by closing the back door opening 26. However, with the vehicular rear satellite sensor mounting structure 40, the effect from impact produced by closing the back door opening 26 is small so the extent of a rear impact is able to be appropriately determined. This has been confirmed through testing.

Figure 7:
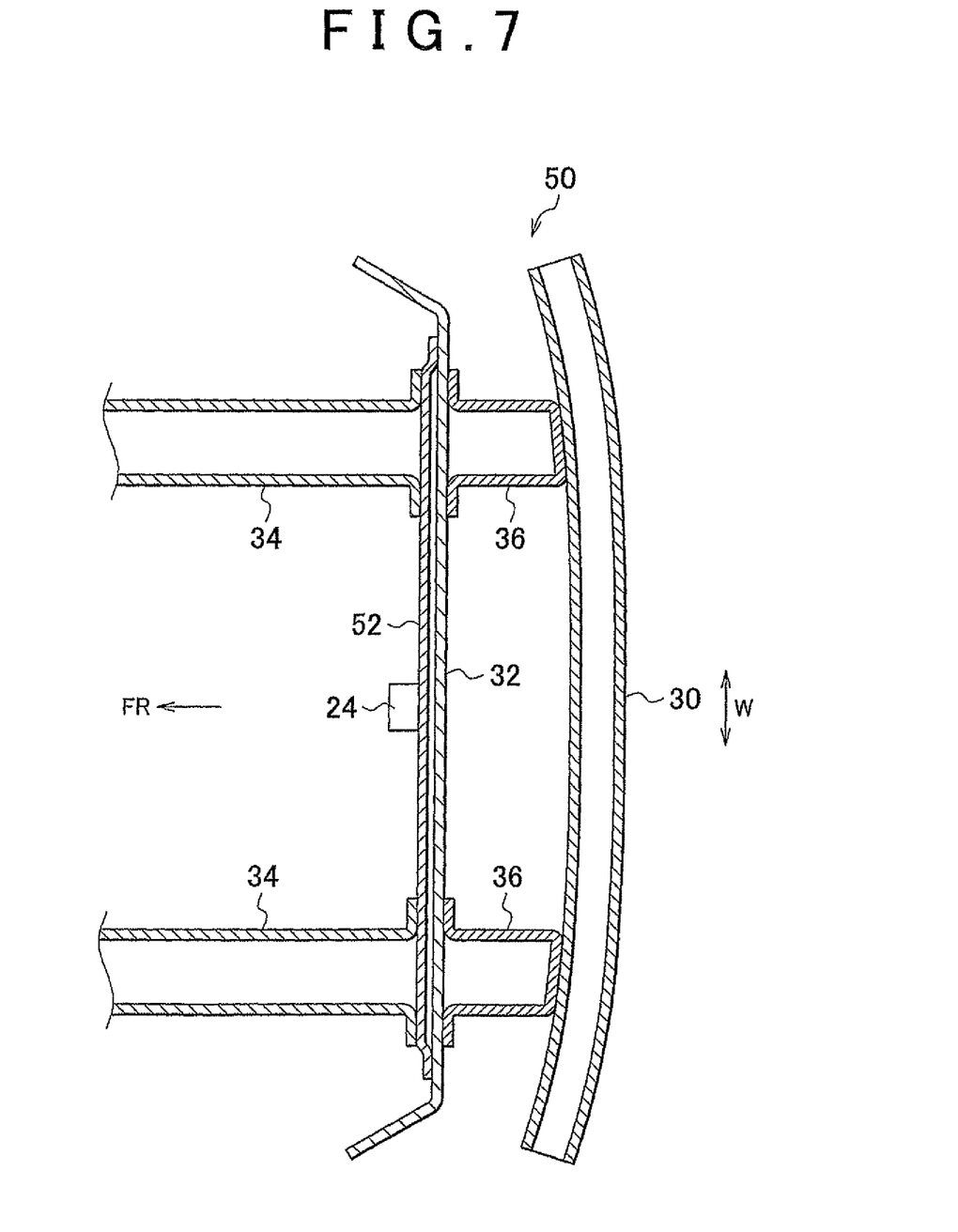
FIG. 7 is an enlarged plan sectional view taken along line VII-VII in FIG. 8, of a vehicular rear satellite sensor mounting structure according to a third example embodiment of the invention.
Figure 8:
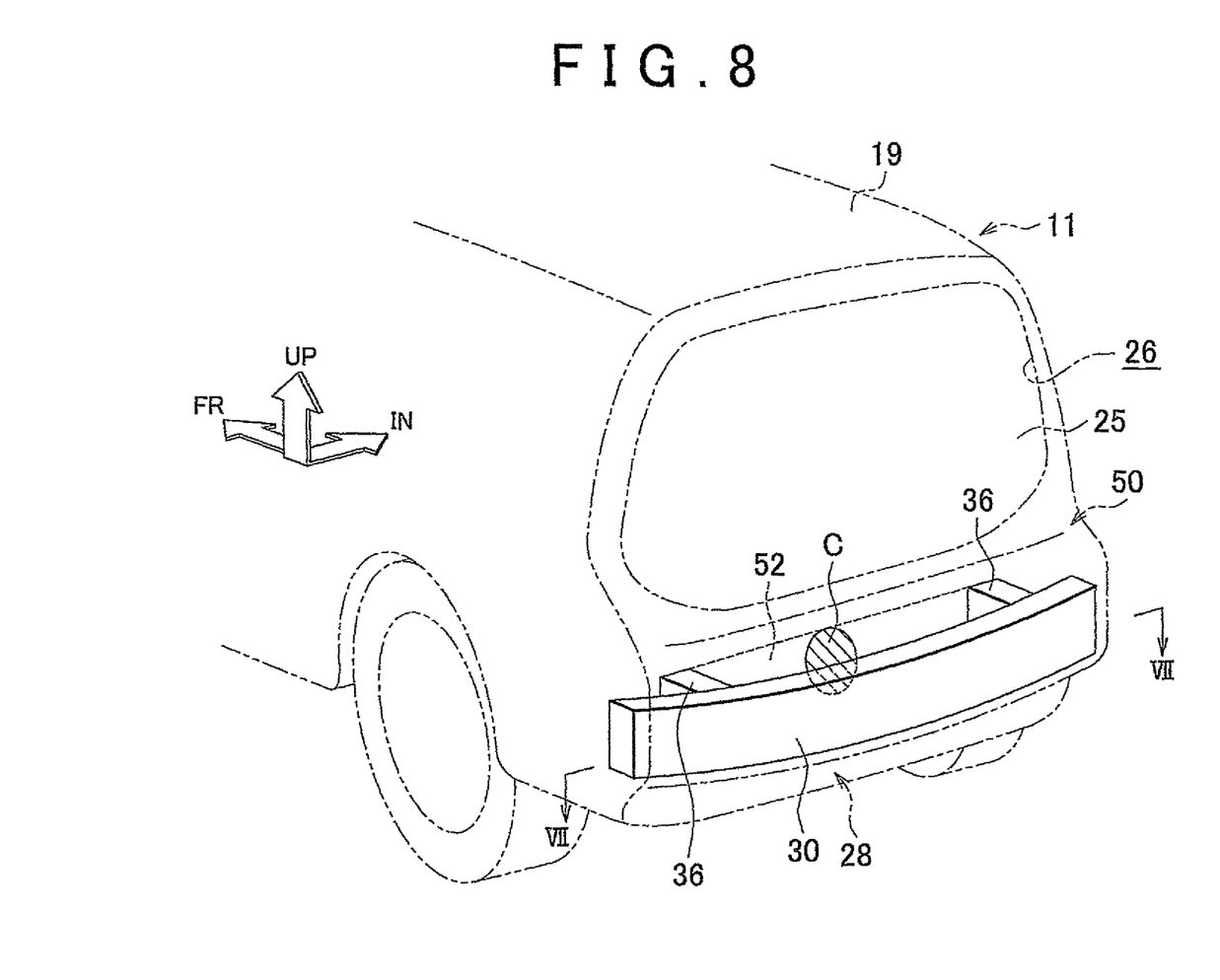
FIG. 8 is a perspective view showing a frame format, as viewed from the rear, of a vehicle to which the vehicular rear satellite sensor mounting structure according to the third example embodiment of the invention has been applied.

FIG. 8 is a perspective view showing a frame format of the rear portion of the vehicle 11 to which a vehicular rear satellite sensor mounting structure 50 according to a third example embodiment of the invention has been applied. Also, FIG. 7 is an enlarged plan sectional view taken along line VII-VII in FIG. 8. As shown in FIG. 7, the vehicular rear satellite sensor mounting structure 50 is formed with a single rear satellite sensor 24 arranged in the center portion of the lower back panel 32 in the width direction.

More specifically, the rear satellite sensor 24 of the vehicular rear satellite sensor mounting structure 50 is arranged in a region C that overlaps with the rear bumper reinforcement 30 when viewed from the rear and is in the center between left and right bumper arms 36 (and rear side members 34), as shown in FIG. 8.

Also, in the third example embodiment, a lower back panel reinforcement 52 is provided which functions as a reinforcing member that extends between the portions where the left and right rear side members 34 are connected on the inside surface of the lower back panel 32, and the rear satellite sensor 24 is fixed to the inside surface of the center portion of the lower back panel reinforcement 52 in the width direction.

The other structure of the vehicular rear satellite sensor mounting structure 50 is the same as the structure corresponding to the vehicular rear satellite sensor mounting structure 10.

Therefore, the third example embodiment is able to obtain basically the same effects as the first example embodiment except for the operational effect that results from the pair of left and right rear satellite sensors 24 being provided.

With this vehicular rear satellite sensor mounting structure 50, only a single rear satellite sensor 24 is used so the effect of shortening the sensing time of the rear satellite sensor 24 and thus sensing an impact earlier is slightly less than it is with the vehicular rear satellite sensor mounting structure 10. However, the vehicular rear satellite sensor mounting structure 50 can still be practically applied to a vehicle 11 in which there is a fair amount of space behind the rear seat 16 (i.e., in which there is a good distance between the head of an occupant and the interior or the rear windshield), or in a vehicle 11 which is quite rigid such that it takes a relatively long time for the airbag apparatus 14 to completely deploy the airbag after impact is detected (i.e., in which the deployment time is relatively long).

Also, with the vehicular rear satellite sensor mounting structure 50, the rear satellite sensor 24 is provided on the lower back panel reinforcement 52 that reinforces the lower back panel 32 (or in an area opposite the area where the lower back panel reinforcement 52 is arranged on the lower back panel 32). As a result, even if the rear bumper reinforcement 30 deforms and contacts the lower back panel 32 at a portion that is relatively far from the rear satellite sensor 24, attenuation of the acceleration transmitted from the rear bumper reinforcement 30 will be suppressed by the lower back panel reinforcement 52. Therefore, the sensing time by the rear satellite sensor 24 can be shortened such that an impact can be sensed earlier compared with a structure in which the lower back panel reinforcement 52 is not provided.

Incidentally, for example, in the third example embodiment described above, the lower back panel reinforcement 52 may also be omitted depending on the deployment time of the rear airbag apparatus 14.

Figure 9:
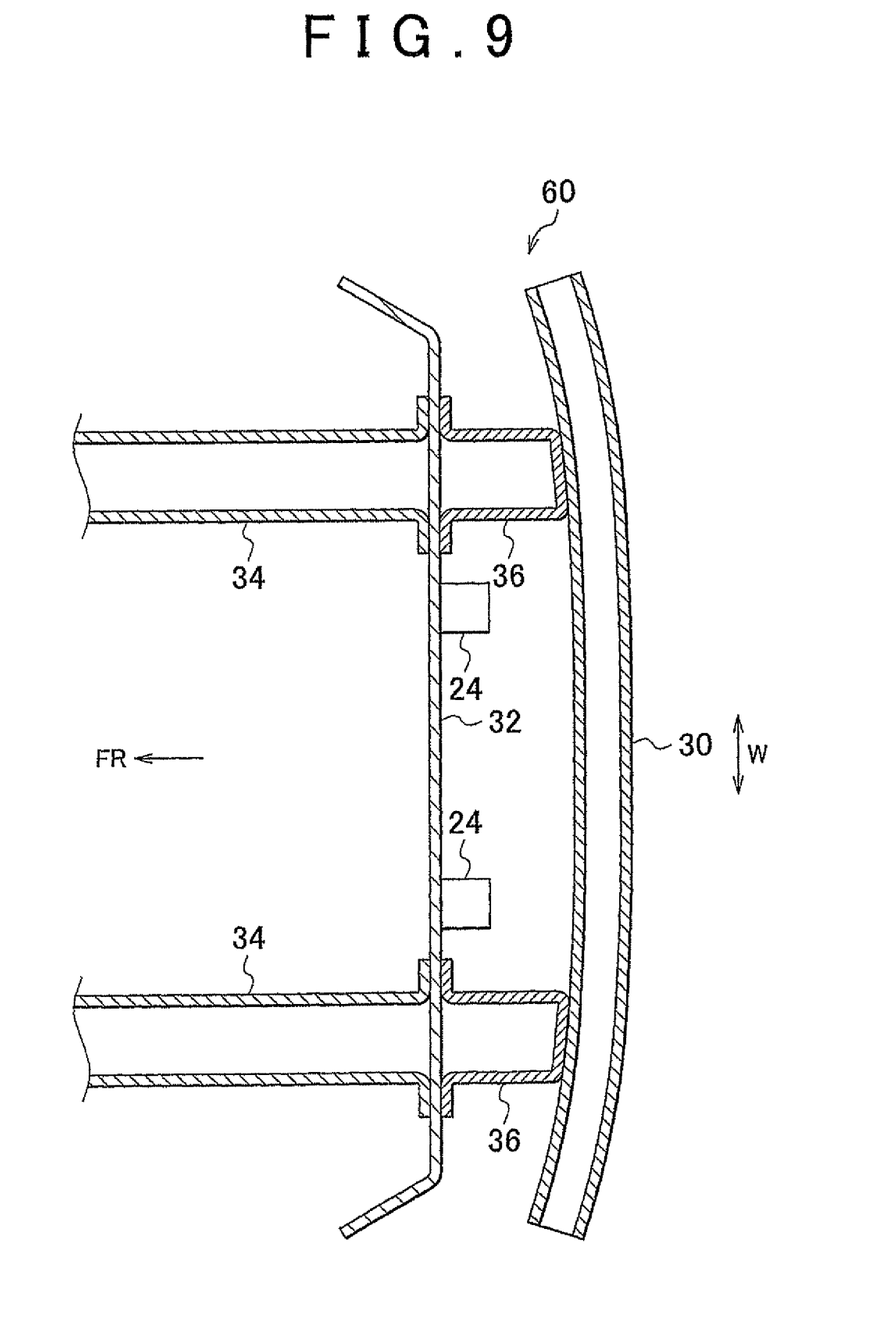
FIG. 9 is a plan sectional view corresponding to FIG. 1, of a vehicular rear satellite sensor mounting structure according to a fourth example embodiment of the invention.

FIG. 9 is a plan sectional view corresponding to FIG. 1, of a vehicular rear satellite sensor mounting structure 60 according to a fourth example embodiment of the invention. As shown in FIG. 9, the vehicular rear satellite sensor mounting structure 60 is such that rear satellite sensors 24 are arranged on the side of the lower back panel 32 that faces the rear bumper reinforcement 30 (i.e., on the rear surface of the lower back panel 32).

Accordingly, with the vehicular rear satellite sensor mounting structure 60, if the rear bumper reinforcement 30 deforms during a rear impact, it will directly contact the rear satellite sensors 24 (and thus transmit the acceleration to the rear satellite sensors 24).

The other structure of the vehicular rear satellite sensor mounting structure 60 is the same as the structure corresponding to the vehicular rear satellite sensor mounting structure 10.

Therefore, the fourth example embodiment is able to obtain basically the same effects as the first example embodiment.

Also, with the vehicular rear satellite sensor mounting structure 60, the rear satellite sensors 24 is fixed to the lower back panel 32. Therefore, from the initial stage of a rear impact, a large acceleration can be transmitted from the rear bumper reinforcement 30 to the rear satellite sensors 24, which contributes to a shorter sensing time by the rear satellite sensors 24, thereby enabling a rear impact to be sensed earlier.

Figure 10:
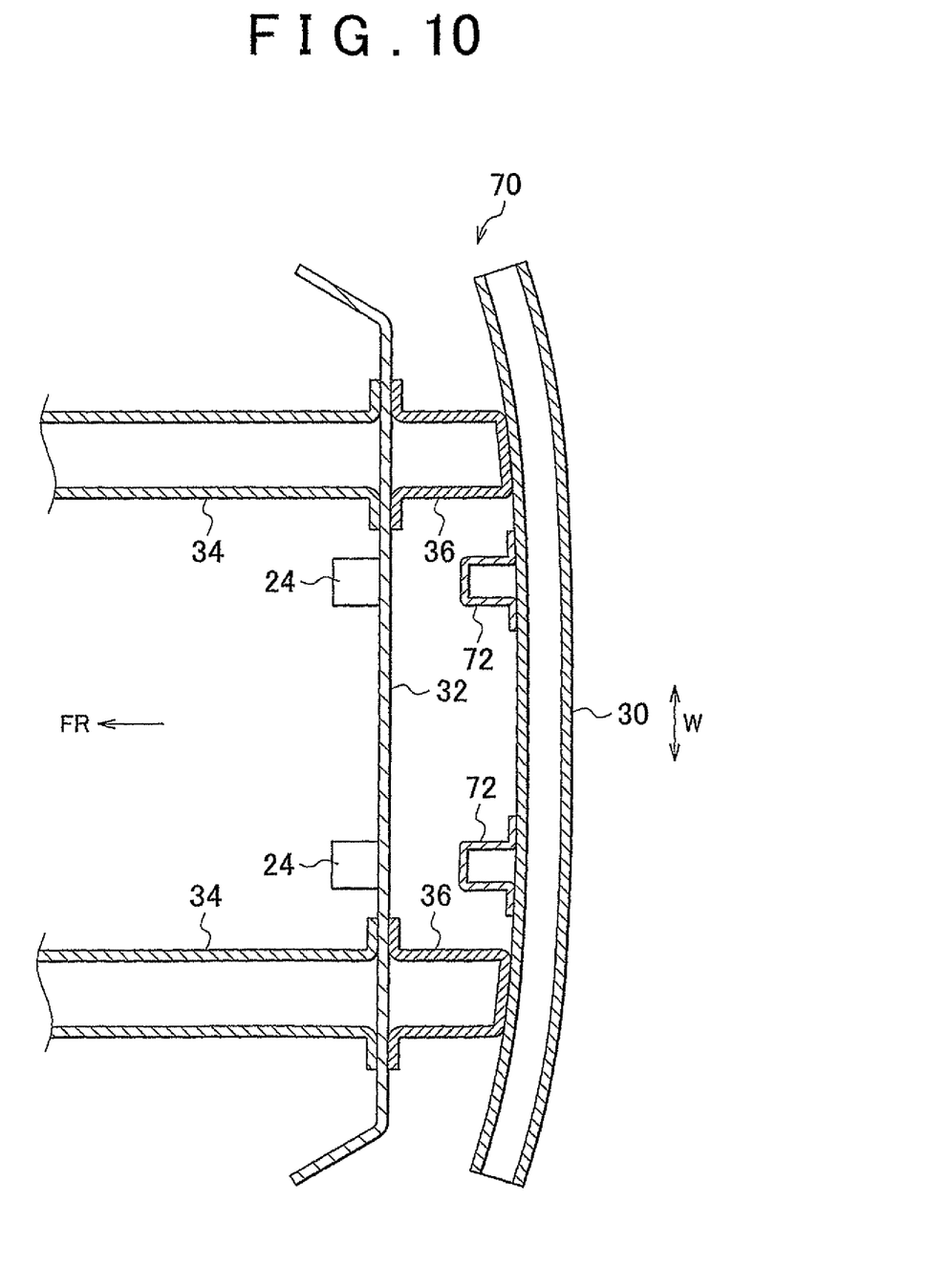
FIG. 10 is a plan sectional view corresponding to FIG. 1, of a vehicular rear satellite sensor mounting structure according to a fifth example embodiment of the invention.

FIG. 10 is a plan sectional view corresponding to FIG. 1, of a vehicular rear satellite sensor mounting structure 70 according to a fifth example embodiment of the invention. As shown in FIG. 10, the vehicular rear satellite sensor mounting structure 70 has protruding portions 72 that function as impact transmitting portions on the front surface of the rear bumper reinforcement 30 that faces the lower back panel 32.

The protruding portions 72 are formed on the rear bumper reinforcement 30 in a pair, with one on the left and one on the right, in positions overlapping with the positions where the pair of rear satellite sensors 24 are mounted on the lower back panel 32, when viewed from the rear. As a result, with the vehicular rear satellite sensor mounting structure 70, when the rear bumper reinforcement 30 deforms during a rear impact, the protruding portions 72 directly contact the portion where the, rear satellite sensors 24 are arranged on the lower back panel 32. Therefore, the running distance until the acceleration is transmitted from the rear bumper reinforcement 30 to the rear satellite sensors 24 is shorter with the vehicular rear satellite sensor mounting structure 70 than it is with the vehicular rear satellite sensor mounting structure 10. Incidentally, in this example embodiment, the protruding portions 72 are made of metal, have generally hat-shaped cross sections, and are fixed by welding or the like to the front surface of the rear bumper reinforcement 30 in the longitudinal direction of the vehicle.

The other structure of the vehicular rear satellite sensor mounting structure 70 is the same as the structure corresponding to the vehicular rear satellite sensor mounting structure 10.

Therefore, the fifth example embodiment is able to obtain basically the same effects as the first example embodiment.

Also, with the vehicular rear satellite sensor mounting structure 70, the time that is takes for acceleration to be transmitted to the rear satellite sensors 24 during a rear impact is able to, be even shorter because the running distance until the acceleration is transmitted from the rear bumper reinforcement 30 to the rear satellite sensors 24 is made shorter by providing the protruding portions 72. That is, the protruding portions 72 contribute to a shorter sensing time by the rear satellite sensors 24, thereby enabling a rear impact to be sensed earlier. Also, the vehicular rear satellite sensor mounting structure 70 can be easily applied to different vehicles by appropriately adjusting the shape (i.e., the dimensions in the longitudinal direction of the vehicle) of the protruding portions 72 that are fixed to the front surface of the rear bumper reinforcement 30 in the longitudinal direction of the vehicle.

Figure 11:
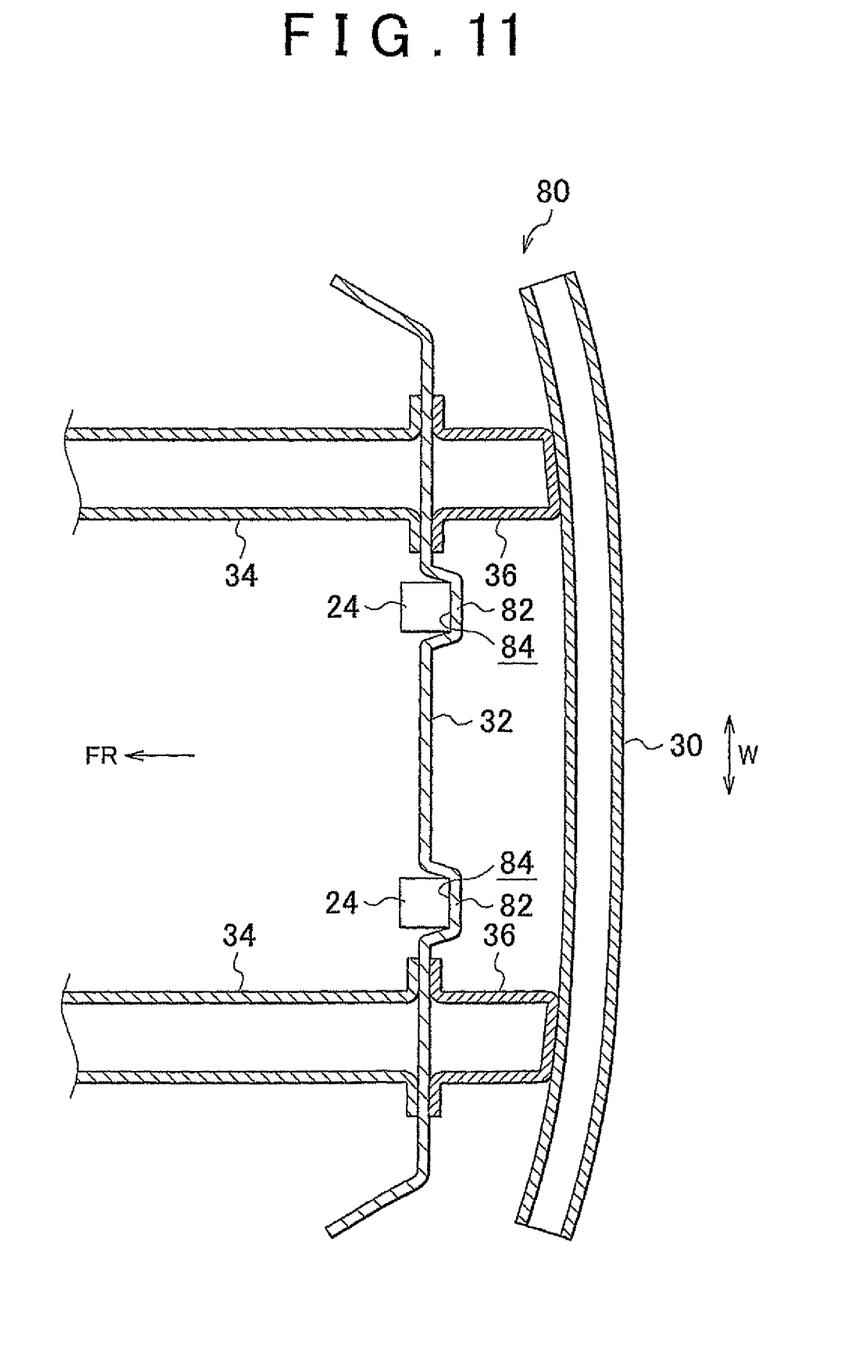
FIG. 11 is a plan sectional view corresponding to FIG. 1, of a vehicular rear satellite sensor mounting structure according to a sixth example embodiment of the invention.

FIG. 11 is a plan sectional view corresponding to FIG. 1, of a vehicular rear satellite sensor mounting structure 80 according to a sixth example embodiment of the invention. As shown in FIG. 11, the vehicular rear satellite sensor mounting structure 80 has protruding portions 82 that function as impact transmitting portions that protrude toward the rear on the rear surface of the lower back panel 32 that faces the rear bumper reinforcement 30.

The protruding portions 82 are formed as the reverse side (i.e., the opposite side) of concave portions 84 that open to the front side of the lower back panel 32. The rear satellite sensors 24 are fixed to the bottoms of the concave portions 84. That is, the protruding portions 82 are provided, one on the right and one on the left, in positions corresponding to the positions where the rear satellite sensors 24 are arranged on the lower back panel 32. As a result, with the vehicular rear satellite sensor mounting structure 80, when the rear bumper reinforcement 30 deforms during a rear impact, it will directly contact the protruding portions 82, which are the portions where the rear satellite sensors 24 are arranged. Therefore, with the vehicular rear satellite sensor mounting structure 80, the running distance until the acceleration is transmitted from the rear bumper reinforcement 30 to the rear satellite sensors 24 is shorter than it is with the vehicular rear satellite sensor mounting structure 10.

The other structure of the vehicular rear satellite sensor mounting structure 80 is the same as the structure corresponding to the vehicular rear satellite sensor mounting structure 10.

Therefore, the sixth example embodiment is able to obtain basically the same effects as the first example embodiment.

Also, with the vehicular rear satellite sensor mounting structure 80, the time that is takes for acceleration to be transmitted to the rear satellite sensors 24 is able to be even shorter because the running distance until the acceleration is transmitted from the rear bumper reinforcement 30 to the rear satellite sensors 24 is made shorter by providing the protruding portions 82. That is, the protruding portions 82 contribute to a shorter sensing time by the rear satellite sensors 24, thereby enabling a rear impact to be sensed earlier.

Incidentally, the invention is not limited to the example embodiments described above, but may also cover various modifications and equivalent arrangements. Accordingly, for example, the invention may also be carried out by suitably combining characteristic elements of the foregoing example embodiments. For example, in the second, third, fifth, and sixth example embodiments, rear satellite sensors 24 may be fixed to the rear surface (i.e., the rearmost surface (i.e., the top surface) of the protruding portions 82) of the lower back panel 32, just as in the fourth example embodiment. Also, for example, in the first example embodiment, a pair of rear satellite sensors 24 may be provided on the lower back panel 32 via a lower back panel reinforcement 52. Also, a protruding portion 72 or 82 may be applied to the third example embodiment. Furthermore, in the second and third example embodiments, a pair of rear satellite sensors 24 may be arranged between the lower back panel 32 and the lower back panel reinforcement 42 or 52.

Also, in the example embodiments described above, the rear satellite sensor 24 is used as a trigger for increasing the rear impact sensitivity of the airbag ECU 22. However, the invention is not limited to this. For example, the airbag ECU 22 may also be structured to determine whether to activate the rear airbag apparatus 14 based on a signal from the rear satellite sensor 24.

Moreover, in the example embodiments described above, the rear satellite sensor 24 which is an acceleration sensor is used as the rear impact sensor for detecting movement from a rear impact. However, the invention is not limited to this. For example, .a load sensor or the like may be used instead.

The invention claimed is:

1. A vehicular rear impact sensor mounting structure comprising
   a pair of rear side members which are parallel to one another in a vehicle width direction;
   a rear bumper reinforcement that is connected to the rear end portions of the rear side members via a pair of left and right bumper arms forming crash boxes;
   a lower back panel that is fitted to the rear side members forward of the rear bumper reinforcement in a vehicle longitudinal direction and opposite the rear bumper reinforcement; and
   a rear impact sensor that is provided to detect a rear impact to a vehicle, wherein said rear impact sensor is located on an area of the lower back panel that directly contacts the rear bumper reinforcement when the rear bumper reinforcement deforms from a rear impact and is spaced apart from said rear bumper reinforcement by a predetermined distance therebetween.

2. The vehicular rear impact sensor mounting structure according to claim 1, wherein at least two rear impact sensors are provided apart from one another in the vehicle width direction in an area on the lower back panel which overlaps with the rear bumper reinforcement when viewed from the rear, and between the pair of rear side members.

3. The vehicular rear impact sensor mounting structure according to claim 2, wherein one of the rear impact sensors is provided on a first side portion and one of the rear impact sensors is provided on a second side portion of the lower back panel, the first and second side portions being distant from each other in the vehicle width direction, of the lower back panel.

4. The vehicular rear impact sensor mounting structure according to claim 1, wherein a reinforcing member that reinforces a region that includes a portion where the pair of rear side members are connected to the lower back panel is provided on the lower back panel, and the rear impact sensor is arranged on the reinforcing member or on the lower back panel in an area opposite the area where the reinforcing member is arranged on the lower back panel.

5. The vehicular rear impact sensor mounting structure according to claim 4, wherein the reinforcing member includes a pair of extended portions each of which extends in the vehicle vertical direction from the portion where a corresponding one of the pair of rear side members is connected to the lower back panel, and one rear impact sensor is provided on each of the extended portions.

6. The vehicular rear impact sensor mounting structure according to claim 5, wherein the rear impact sensor is arranged below a lower edge of a back door for opening and closing a back door opening.

7. The vehicular rear impact sensor mounting structure according to claim 1, wherein a reinforcing member is fixed to the front surface of the lower back panel, and the rear impact sensor is fixed to the front surface of the reinforcing member.

8. The vehicular rear impact sensor mounting structure according to claim 1, wherein a reinforcing member is fixed to the front surface of the lower back panel, and the rear impact sensor is fixed in an area on the rear surface of the lower back panel which overlaps with the rear bumper reinforcement when viewed from the rear.

9. The vehicular rear impact sensor mounting structure according to claim 1, wherein the rear impact sensor is provided in a center portion of the lower back panel between the pair of rear side members, in an area that overlaps with the rear bumper reinforcement when viewed from the rear.

10. The vehicular rear impact sensor mounting structure according to claim 1, wherein the each of rear side members each includes bumper arms.

11. The vehicular rear impact sensor mounting structure according to claim 1, wherein the rear impact sensor outputs a detection signal only in case the rear bumper reinforcement deforms so as to contact the lower back panel during a rear impact.

* * * * *